(12) United States Patent
Haq et al.

(10) Patent No.: US 7,794,784 B2
(45) Date of Patent: Sep. 14, 2010

(54) FORMING NANOSTRUCTURES

(75) Inventors: Sajad Haq, Bristol (GB); Ioannis Alexandrou, Liverpool (GB); Gehan A J Amaratunga, Cambridge (GB); Khai H Ang, Cambridge (GB)

(73) Assignee: BAE Systems plc, London (GB)

( * ) Notice: Subject to any disclaimer, the term of this patent is extended or adjusted under 35 U.S.C. 154(b) by 1616 days.

(21) Appl. No.: 10/517,257

(22) PCT Filed: Nov. 4, 2004

(86) PCT No.: PCT/GB2004/004670

§ 371 (c)(1), (2), (4) Date: Dec. 7, 2004

(87) PCT Pub. No.: WO2005/047179

PCT Pub. Date: May 26, 2005

(65) Prior Publication Data

US 2005/0172370 A1    Aug. 4, 2005

(30) Foreign Application Priority Data

Nov. 7, 2003  (GB) ................... 0326134.4
Nov. 10, 2003 (EP) ................... 03257075

(51) Int. Cl.
  *B05D 7/00* (2006.01)
(52) U.S. Cl. ............. 427/212; 427/127; 427/128; 264/109; 264/123
(58) Field of Classification Search ............ 427/212, 427/127, 128; 264/109, 123; 428/548
See application file for complete search history.

(56) References Cited

U.S. PATENT DOCUMENTS

| 4,983,244 | A | * | 1/1991 | Murakami et al. | ........... 156/224 |
| 5,780,101 | A | * | 7/1998 | Nolan et al. | ................. 427/216 |
| 5,965,267 | A | | 10/1999 | Nolan et al. | |
| 6,063,243 | A | | 5/2000 | Zettl et al. | |
| 7,014,737 | B2 | * | 3/2006 | Harutyunyan et al. | .... 204/158.2 |

FOREIGN PATENT DOCUMENTS

| EP | 1 061 041 | 12/2000 |
| EP | 1 340 714 | 9/2003 |
| WO | WO 02/076887 | 10/2002 |
| WO | WO 02/092506 | 11/2002 |

(Continued)

OTHER PUBLICATIONS

Setlur et al., Appl. Phys. Lett. 69 (3), p. 345 (1996).*

(Continued)

*Primary Examiner*—Michael Cleveland
*Assistant Examiner*—Robert Vetere
(74) *Attorney, Agent, or Firm*—Nixon & Vanderhye P.C.

(57) ABSTRACT

A method of forming a nanowire comprising: providing nanoparticles of a metallic material; providing a vapor of fluorocarbon molecules by heating a solid polymer; depositing at least some of the carbon of said molecules onto an exterior of one of said particles to form a deposit of carbon which surrounds at least part of the exterior of said one particle and assembling further of said particles with said one particle to form an elongate configuration of material in the form of a nanowire. Similar methods of production of nanotubes are also disclosed.

22 Claims, 7 Drawing Sheets

FOREIGN PATENT DOCUMENTS

| WO | WO03/008331 | * | 1/2003 |
|---|---|---|---|
| WO | WO 03/008331 | | 1/2003 |
| WO | WO 03/016209 | | 2/2003 |
| WO | WO 03/018466 | | 3/2003 |

OTHER PUBLICATIONS

Oku et al., Microelectronic Engr., 51-52, p. 51 (2000).*

A.A. Setlur, et al, "A Method for Synthesizing Large Quantities of Carbon Nanotubes and Encapsulated Copper Nanowires" *Applied Physics Letters* vol. 69, No. 3, Jul. 1996, pp. 345-347.

T. Oku et al, "One-Dimensional Positioning of Carbon Nanocapsules and Spontaneous Formation of Carbon Nanotubes by Self-Organization of Gold Nanoparticles" *Microelectronic Engineering* vol. 51-52, May 2000, pp. 51-60.

A.A. Setlur et al, "Formation of Filled Carbon Nanotubes and Nanoparticles Using Polycyclic Aromatic Hydrocarbon Molecules" *Carbon* vol. 36, No. 5-6, 1998, pp. 721-723.

K.B.K. Teo et al, "Uniform Patterned Growth of Carbon Nanotubes Without Surface Carbon" *Applied Physics Letters* vol. 79, No. 10, Sep. 2001, pp. 1534-1536.

B.O. Boskovic et al "Large-Area Synthesis of Carbon Nanofibres at Room Temperature" *Nature Materials* vol. 1, Nov. 2002, pp. 165-168.

* cited by examiner

FORMING NANOSTRUCTURES

This application is the US national phase of international application PCT/GB2004/004670, filed in English on 4 Nov. 2004, which designated the US. PCT/GB2004/004670 claims priority to GB Application No. 0326134.4 filed 7 Nov. 2003 and EP Application No. 03257075.6 filed 10 Nov. 2003. The entire contents of these applications are incorporated herein by reference.

FIELD OF THE INVENTION

The present invention relates to methods of forming nanostructures, particularly to methods of forming nanowires and nanotubes.

BACKGROUND OF THE INVENTION

Nanotechnology is defined by the Institute of Nanotechnology in the UK as "science and technology where dimensions and tolerances in the range of 0.1 nanometers (nm) to 100 nm play a critical role".

Research in the field of nanotechnology is a rapidly expanding industry and includes the production of nanostructures—structures which have at least one dimension at least approximately on the scale of 0.1 to 100 nm (referred to as the "nano-scale"). Two examples of nanostructures are nanowires and nanotubes, which each have a nano-scale cross section.

Methods of forming nanostructures include methods based on the miniaturisation of technology developed initially at a scale greater than the nano-scale, and new methods for the formation of nanostructures from molecular elements.

Current methods of forming nanowires are usually electrochemically based and involve the use of porous materials such as alumina. The pores of such materials are, for example, channels having the desired dimensions for the nanowires to be formed. Ions of the metal from which the nanowires are to be formed are contained in an electrolyte and are drawn into the channels by applying a voltage across two electrodes being positioned at either end of the channels. Once the nanowires are formed, extracting the nanowires from the porous material commonly involves removal of the porous material.

The nanowires formed in this process are often collected as a powder and the collection and manipulation of individual nanowires is a relatively time consuming, skillful and cost inefficient process. To date there is no automated process for the reliable manipulation of individual nanowires. This makes the use in industry of the nanowires produced by this process impractical. Additionally, the pores of the porous material are often machined to meet desired dimensions of the nanowires to be formed. This proves to be difficult if the dimensions of the pores are required to meet strict tolerances.

Scientific paper "Synthesis and magnetic behavior of an array of nickel-filled carbon nanotubes", Applied Physics Letters 81, 4592 (2002) describes a method of forming nickel-filled carbon nanotubes. In this method hollow carbon nanotubes are first formed within pores of an alumina membrane. For this, acetylene gas ($C_2H_2$) at a relatively high temperature of 700° C. is used. Nickel (Ni) is then deposited inside the hollow nanotubes by an electrochemical method similar to that described earlier. Once the nanowires are formed, the alumina is removed and, in this method, the nickel-filled nanotubes are obtained as an ordered array in which the nanowires are aligned with each other. Despite this order and alignment, any manipulation of individual nanotubes is difficult. Additionally, the relatively high temperature of the method prevents use of reagents which are unstable at such temperatures. The use of acetylene gas is relatively hazardous as the gas is flammable, especially at relatively high temperatures.

Carbon nanotubes are commonly formed on a substrate having a ferromagnetic catalytic layer of for example, nickel. In general, a carbon vapour plasma is formed by the decomposition of a gas, for example acetylene, due to heating and/or an application of an electric field. The carbon of the plasma reacts with the catalytic layer to form nanotubes which form vertically from the substrate and are approximately aligned with each other. Often the catalytic layer forms individual particles upon heating, each individual particle leading to the formation of one nanotube. Aligned nanotubes only usually form in the presence of an externally applied electric field.

The scientific paper "Uniform patterned growth of carbon nanotubes without surface carbon", K. B. K. Teo, M. Chhowalla, G. A. J. Amaratunga, W. I. Milne, D. G. Hasko, G. Pirio, P. Legagneux. F. Wyczisk, and D. Pribat, Applied Physics Letters 79, 1534 (2001) describes a method of growing vertically aligned nanotubes at precise locations on a substrate. A nickel catalytic film on a substrate forms nanoparticles of the nickel at 700° C. Ammonia and acetylene gases are introduced at this temperature and, using a plasma-enhanced chemical-vapour deposition (PECVD) technique, nanotubes are grown from the nickel nanoparticles, vertically to the substrate. An electric field induced by the plasma causes the nanotubes to be aligned.

The scientific paper "Large-area synthesis of carbon nanofibres at room temperature", B. O. Boskovic, V. Stolojan, R. U. A. Khan, S. Haq, and S. R. P. Silva, Nature Materials, 165 (2002) describes a method of forming carbon nanofibres at room temperature, 100° C. and 250° C. A well-formed nanotube may be considered to comprise a hollow tube having walls formed of curved sheets formed of, e.g. graphite. Each end of the hollow tube is capped with a fullerene hemisphere, typically formed of carbon. A nanofibre may be considered as a nanotube in which the sheet and fullerene structures comprise defects. In this method the nanofibres are formed from nickel particles on a substrate using methane gas as the source of carbon. A radio-frequency voltage applied across the volume of methane creates a hydrocarbon plasma which provides the carbon required for nanofibre formation at the surface of the nickel particles. A nickel particle remains at a tip of each growing nanofibre and, although this method may be performed at room temperature, the radio-frequency PECVD causes superheating of this tip to a temperature of approximately 450-1250° C. to provide a required energy for the reaction. The nanofibres formed by this method are not aligned but have what is referred to as a 'spaghetti morphology'.

In both these methods of the prior art for the formation of nanotubes using a PECVD technique, a relatively high temperature for the formation reaction to occur is required, irrespective of a surrounding temperature. Such relatively high temperatures prevent the use of materials which are unstable at such temperatures. Additionally the use of acetylene or methane gas, which is commonly used in similar nanotube forming reactions, is relatively hazardous as the gas is flammable, especially at relatively high temperatures.

It is an object of the present invention to provide improvements to methods of forming nanowires and nanotubes, particularly at relatively low temperatures.

SUMMARY OF INVENTION

In accordance with a first aspect of the present invention there is provided a method of forming a nanowire comprising:
(a) providing an arrangement of nanoparticles comprising a first material;
(b) providing a fluid of molecules;
(c) depositing at least some second material from said fluid of molecules onto an exterior surface of one of said nanoparticles to form a deposit which surrounds at least part of the exterior of said one nanoparticle; and
(d) assembling more of said first material from said nanoparticles with said one nanoparticle to produce an elongate configuration of said first material in the form of a nanowire.

Preferably, each of the molecules is a decomposition product. More preferably, the decomposition products form a vapour. Preferably, the vapour is provided from a polymer which is initially solid and heated to reach a temperature of between 100 and 600° C.; this causes decomposition of the polymer to form a vapour.

According to a second aspect of the present invention there is provided a method of forming a nanotube comprising:
(a) providing an arrangement of nanoparticles comprising a first material;
(b) providing a fluid of halogenated molecules;
(c) depositing at least some second material from said halogenated molecules onto an exterior surface of one of said nanoparticles to form a first deposit of second material which surrounds at least part of the exterior of said one nanoparticle; and
(d) depositing at least some further second material from said halogenated molecules so as to attach a second deposit of said second material onto said first deposit, to produce an arrangement of deposits in the form of a nanotube.

The temperature of the method for forming the nanowires or the nanotubes is relatively low and allows reagents, which are unstable above these temperatures, to be used in the formation reaction. Additionally, the use of a vapour at such a relatively low temperature is less hazardous than using a flammable gas at relatively high temperatures.

Nanowires and nanotubes formed at these relatively low temperatures can be formed to be substantially linear without the need for an externally applied magnetic or electric field. Furthermore the method of the present invention does not require the use of any plasma based technique. This provides a relatively simple and efficient method of forming nanowires and nanotubes.

With the use of a vapour of the molecules provided by the initially solid polymer, rather than a gas precursor being provided for the formation of the nanowires or nanotubes, lower activation energies are required for the formation reaction to occur.

Apparatus for providing the method for forming the nanowires or nanotubes does not include a gas input system and is consequently relatively simple and cost efficient to install.

For the formation of nanowires of the present invention, dimensions of the nanowires are not determined by a template material, for example a porous material such as alumina. Nanowires having consistent dimensions are efficiently formed without the need for the production of a template material having precise specifications.

Further features and advantages of the invention will become apparent from the following description of preferred embodiments of the invention, given by way of example only, which is made with reference to the accompanying drawings.

DESCRIPTION OF PREFERRED EMBODIMENTS

Figure 1:
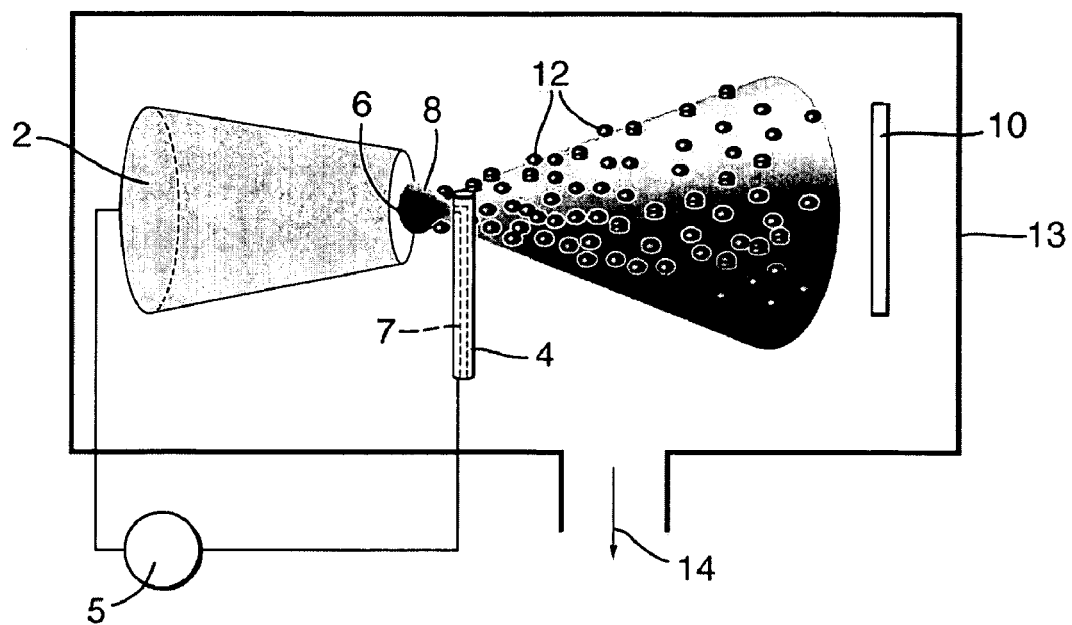
FIG. 1 shows schematically an apparatus for producing nanoparticles in accordance with an embodiment of the present invention.

FIG. 1 shows schematically an apparatus for producing nanoparticles in accordance with an embodiment of the present invention.

The particles are of a metallic material and are provided for the method of forming a nanowire or a nanotube in accordance with embodiments of the present invention. In the case of the embodiments to be described in the following specification, the particles are nanoparticles, each of which has at least one dimension on the nano-scale. The metallic material in this embodiment is cobalt carbide ($CO_3C$) which is an alloy of a ferromagnetic material which in this case is the metal cobalt (Co). The cobalt carbide is formed using a carbon arc technique.

The carbon arc technique involves a cathode 2 formed of graphite, and an anode 4 formed of a mixture of compressed graphite and cobalt powders. The mixture comprises approximately 30-50% by weight of cobalt. A voltaic arc is initiated between the cathode 2 and the anode 4 using a DC electric power source 5, which produces an arc spot 6 on the cathode 2. A plasma 8 is formed between the anode 4 and a substrate 10. The plasma 8 occupies an area which expands in a direction from the cathode 2 and the anode 4 towards the substrate 10. Nitrogen ($N_2$) gas flows through an opening 7 within the anode 4 into a region of the plasma 8. The substrate in this example is formed of a foil of aluminium (Al). Cobalt carbide nanoparticles 12 are formed by this carbon arc technique and are carried by the expanding plasma 8 and deposited on the substrate 10. The carbon arc technique is performed in a reduced pressure environment, preferably a substantial vacuum. By a substantial vacuum, we mean a reduced pressure which is at least an order of magnitude lower than atmospheric pressure. This substantial vacuum is provided by removal 14 of atmospheric molecules in a reaction chamber 13 using a vacuum pump.

Figure 2:
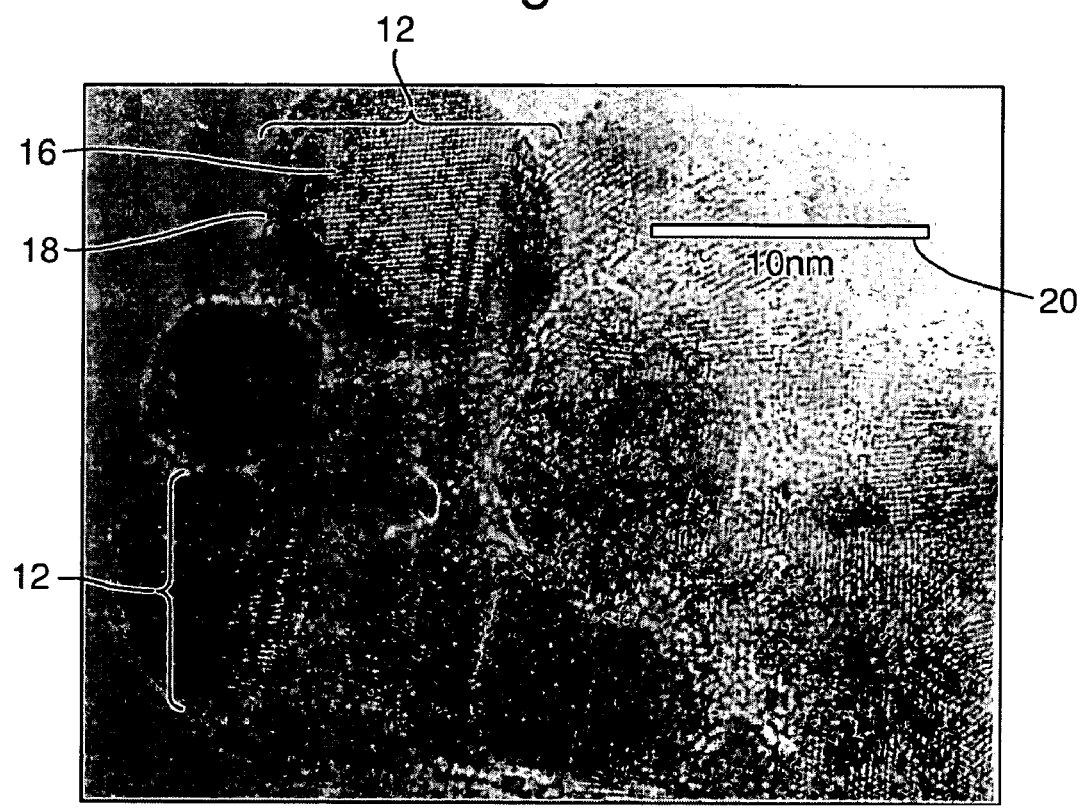
FIG. 2 shows an image of nanoparticles formed in accordance with an embodiment of the present invention.

FIG. 2 shows an image of the cobalt carbide nanoparticles 12 formed using the described carbon arc technique. Note that the images shown herein are recorded using a high resolution electron microscope (HREM). As can be seen, the nanoparticles 12 are approximately spherical and have a core region 16 and a perimeter region 18. The scale bar 20 indicates the average diameter of the nanoparticles 12 in this example to be approximately 5 nm. The core region 16 comprises cobalt carbide and therefore a relatively high proportion of carbon.

Figure 3:
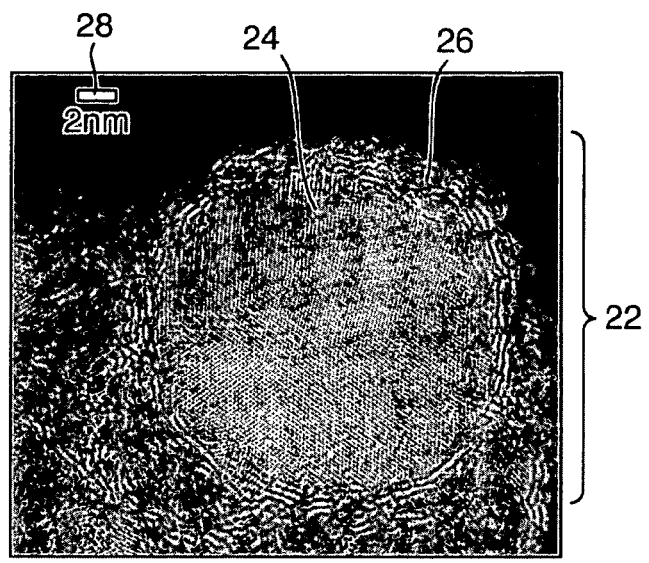
FIG. 3 shows an image of one nanoparticle following an annealing process in accordance with an embodiment of the present invention.

FIG. 3 shows an image of a nanoparticle 12 following an annealing process. In an annealing process the relatively high proportion of carbon of the core region 16 moves to the perimeter region 18. The annealing process involves heating the nanoparticles 12 in a substantial vacuum to a temperature of between 300 and 600° C., in this embodiment approximately 375° C. for a selected period of between 5 and 100 hours, in this embodiment approximately 72 hours. The nanoparticles 12 following the annealing process are annealed nanoparticles 22 and have a core region 24 and a perimeter region 26. The core region 24 of the annealed nanoparticles comprises substantially only cobalt and therefore a relatively low proportion of carbon. The annealed perimeter region 26 comprises a high proportion of carbon which is arranged in layers of graphite. Following removal of the carbon from the core region 16, the annealed core region 24 has an increased magnetisation of a multiple of approximately 100. The scale bar 28 indicates the average diameter of this annealed nanoparticle 22 to be approximately 10 to 12 nm.

Figure 4:
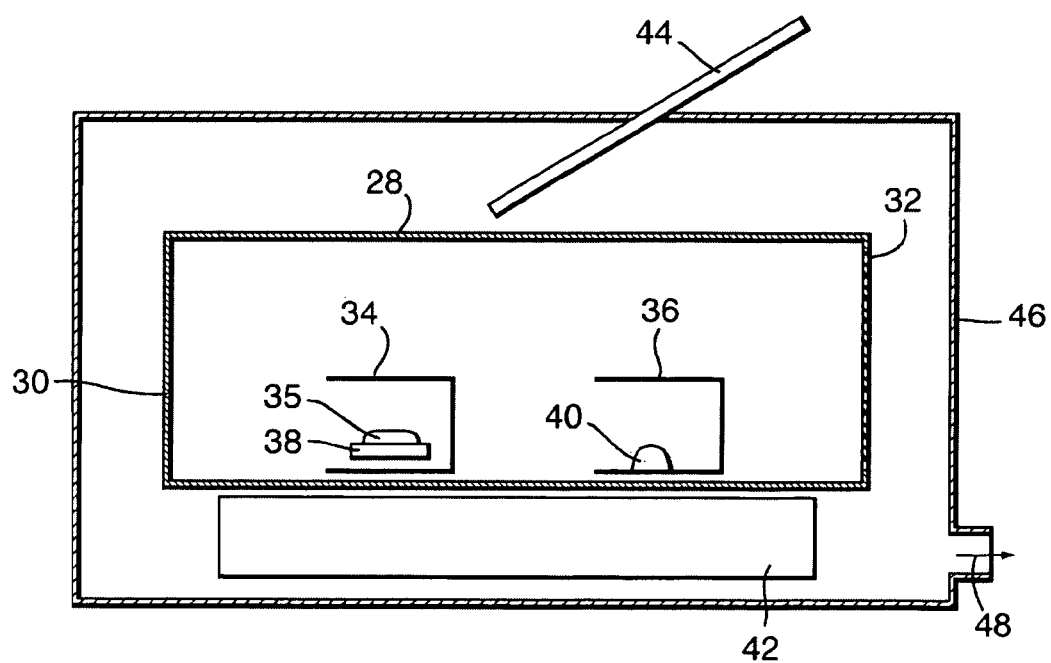
FIG. 4 shows schematically an apparatus for a method of forming a nanowire or a nanotube in accordance with an embodiment of the present invention.

FIG. 4 shows schematically an apparatus for a method of forming a nanowire or a nanotube in accordance with embodiments of the present invention. A reaction vessel is a tube 28 formed of a metal, which in this case is stainless steel, and has a length of approximately 20 cm and a width of approximately 6 cm. A first end 30 of the tube 28 is sealed and a second end 32 of the tube 28 is perforated. Inside the tube 28 is a first reagent vessel 34 and a second reagent vessel 36, both reagent vessels being beakers with a volume of approximately 5 ml and being formed of quartz. The first and the second reagent vessels 34, 36 lie on one side and an open end of each vessel faces the sealed first end 32. The first reagent vessel 34 contains a plurality of agglomerated masses of nanoparticles 35 arranged on a substrate. In embodiments of the present invention, unless stated otherwise, the nanoparticles 35 are the nanoparticles 22 formed using the carbon arc technique described earlier, without having being annealed.

The substrate in this example is a grid 38, formed of copper, for use in a transmission electron microscope (TEM). The agglomerated masses of nanoparticles 35 rest on a film of carbon comprising layers of amorphous carbon which is supported on a surface of the TEM grid 38. The carbon comprising layers may include a carbon nitride or carbon oxide support layer. The second reagent vessel 36 contains a plurality of molecules 40 which are in the form of an initially solid polymer.

Nanowire or nanotube formation conditions are provided by the apparatus and include applying heat to reach a temperature T which is arranged to both melt the solid polymer 40 and to prevent a coalescence of the nanoparticles 36. For embodiments to be described, the temperature T is below 600° C., and preferably above 100° C. More preferably, the temperature T is below 500° C. and above 150° C. In this embodiment, the temperature used was approximately 375° C. A heater 42 provides the heat to reach this temperature T and a thermocouple 44 aids regulation of the temperature T. The nanowire or nanotube formation conditions further include providing a substantial vacuum, in this embodiment approximately $10^{-6}$ mbar prior to providing the temperature T. The tube 28 is placed inside a vacuum chamber 46, from which atmospheric gas is removed 48 with a pump, to provide the substantial vacuum. For embodiments to be described, the nanowire or nanotube formation conditions are provided for a period of between 3 and 100 hours, in this embodiment approximately 72 hours.

With provision of the nanowire or nanotube formation conditions, the initially solid polymer once melted, decomposes to form a vapour of decomposition products. These decomposition products include molecules which contain carbon and which form a fluid of molecules.

Figure 5:
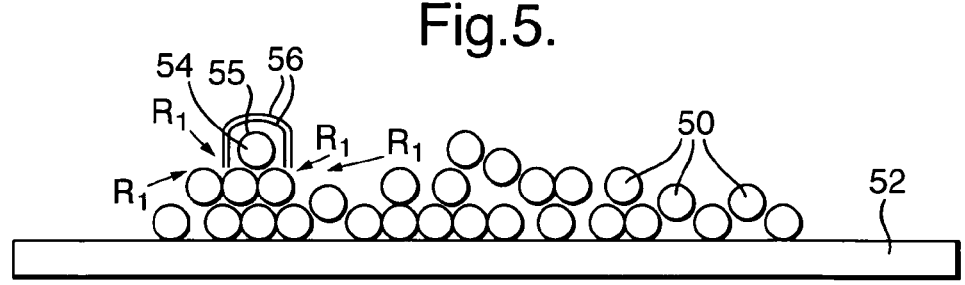
FIG. 5 shows schematically a step of forming a nanowire in accordance with an embodiment of the present invention.

FIG. 5 shows schematically a step of forming a nanowire in accordance with an embodiment of the present invention.

In this embodiment of the present invention a method of forming a nanowire comprises providing an agglomeration of cobalt carbide nanoparticles 50 on a carbon film of the TEM copper grid 52, in accordance with the already described nanowire formation apparatus. The molecules of the vapour contain carbon and are in this embodiment fluorocarbon decomposition products $R_1$, typically having a chemical formula $C_2ClF_3$. The initially solid polymer which provides these fluorocarbon decomposition products $R_1$ is poly(chloro-trifluoro-ethene) which has a chemical formula $(C_2ClF_3)_n$, where n is the number of monomer units in the polymer molecules. This polymer has the trade name Kel-F® and has a melting point of approximately 200° C.

Upon providing the nanowire formation conditions, the decomposition products $R_1$ reach the agglomerate of nanoparticles 50 including one nanoparticle 54. The decomposition products $R_1$ are believed to interact with an exterior 55 of the nanoparticles 50 as indicated by arrows in FIG. 5, and further decomposition of the decomposition products $R_1$ is caused by catalytic action of the nanoparticles 50. The further decomposition of the decomposition products $R_1$ yields carbon, fluorine ($F_2$) and chlorine ($Cl_2$). At least some of the carbon of the decomposition products $R_1$, produced in this further decomposition, is deposited onto the exterior of the one nanoparticle 54 to form a layer of carbon which surrounds at least part of the exterior 55. In this example the layer of carbon comprises graphite and comprises a plurality of layers of graphite 56.

Figure 6:
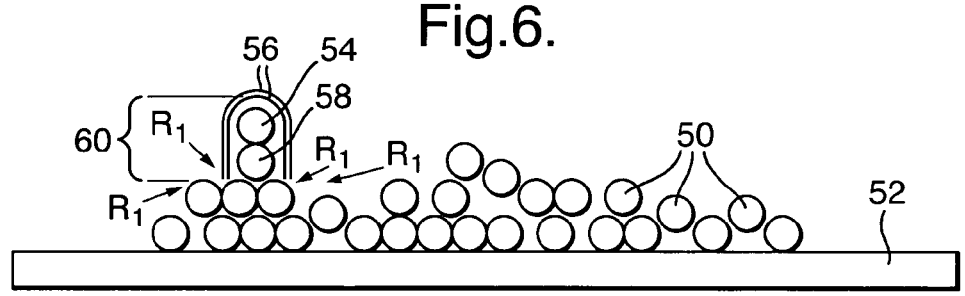
FIG. 6 shows schematically a further step of forming a nanowire in accordance with an embodiment of the present invention.

FIG. 6 shows schematically a further step of forming a nanowire. Following deposition of the carbon onto the one nanoparticle, further decomposition of the decomposition products $R_1$ is provided by the catalytic action of nanoparticles 50 within the vicinity of the one nanoparticle 54. At least some of the carbon of the decomposition products $R_1$, provided by the further decomposition, is deposited onto the layer of carbon which surrounds at least part of the exterior 55 of the one nanoparticle 54 to form a nanotube enclosing an elongate space. The one nanoparticle 54 assembles with further of the nanoparticles 50 including the further nanoparticle 58 to form an elongate configuration of nanoparticles which is a nanowire 60, within the nanotube. In this embodiment, the nanotube comprises layers of graphite. Alternatively, or in addition, the nanotube may include defective graphite, amorphous carbon and/or carbon fiber.

Figure 7:
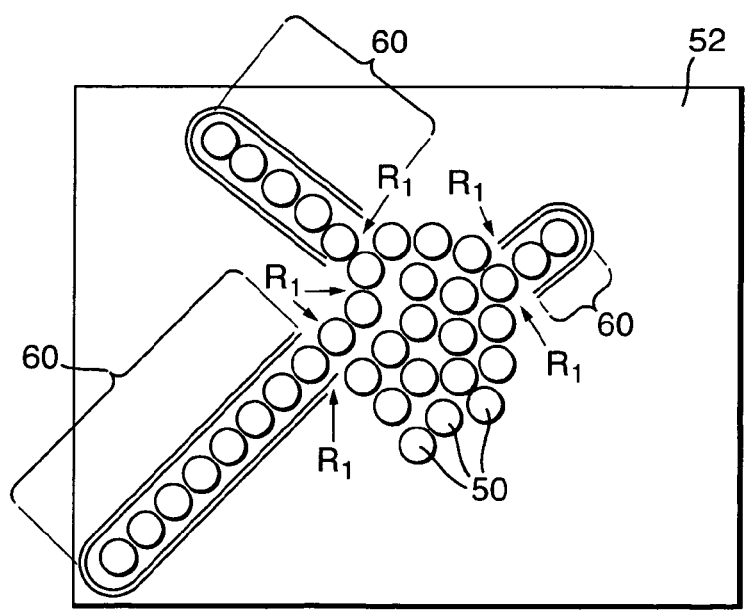
FIG. 7 shows schematically as a top view a formation of nanowires according to an embodiment of the present invention.

FIG. 7 shows schematically as a top view, a formation of a plurality of the nanowires according to the method of forming nanowires of this embodiment of the present invention. Note that a plurality of nanowires 60 is formed from a single agglomerated mass of nanoparticles 50. The nanowires 60, once formed, are typically substantially linear.

Figure 8:
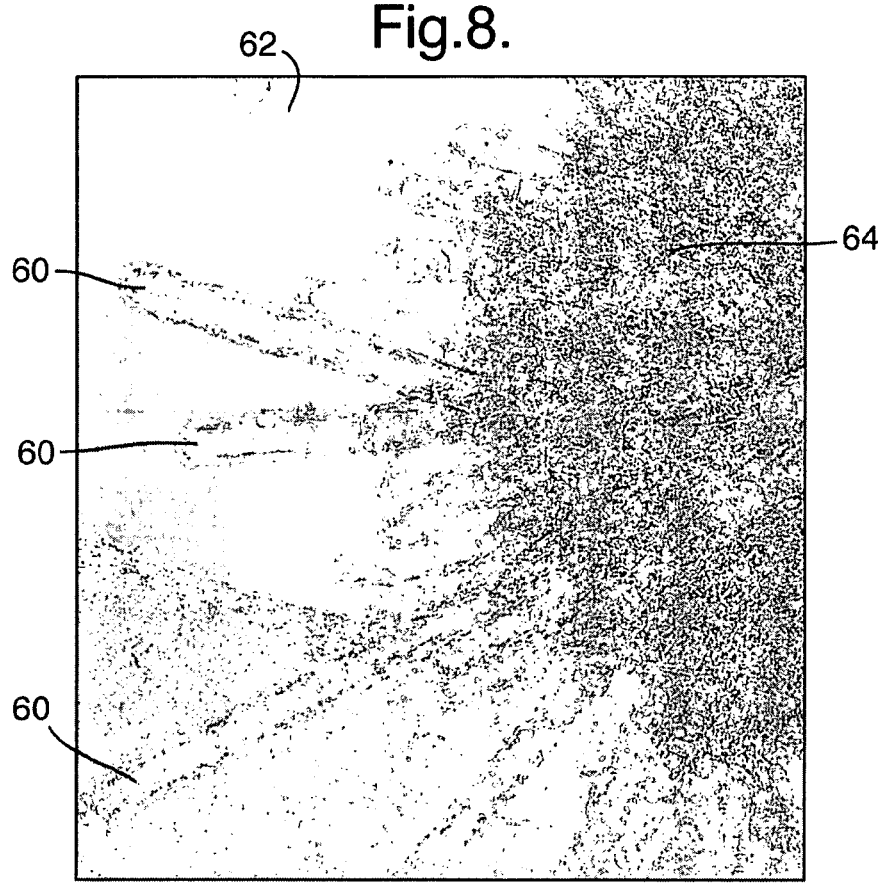
FIG. 8 shows an image, as a top view, of the formation of the nanowires according to an embodiment of the present invention.

FIG. 8 shows a top view of the formation of the plurality of nanowires 60. The image, taken using a transmission electron microscope (TEM), has a scale bar 62 which indicates the average diameter of each nanowire 60 to be approximately 15 to 25 nm. Within this image, the agglomerated mass 64, from which the plurality of nanowires 60 is formed is readily distinguished. The image of FIG. 8 is taken looking down towards the surface of the TEM grid 52 on which the nanoparticles 50 are mounted. Nanowires 60 are seen forming in directions approximately parallel a plane of the surface of the TEM grid 52. It is noted that nanowires 60 may also form in further directions, including a direction perpendicular to the plane mentioned above.

Figure 9:
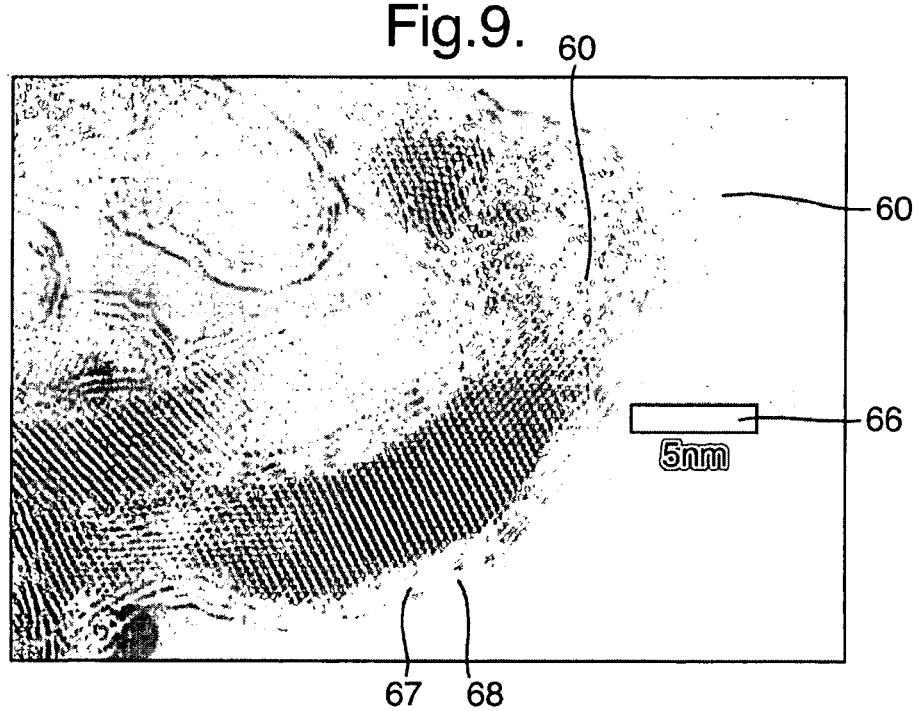
FIG. 9 shows an image of the nanowires at a higher magnification level in accordance with an embodiment of the present invention.

FIG. 9 shows a further TEM image of the nanowires 60 at a higher magnification. The scale bar 66 indicates the average width of the nanowires 60 to be approximately 5 nm. The closer magnification of this image allows detail of the nanowires 60 to be seen. The nanowires 60 have a core region 67 which corresponds to the nanoparticles 50, including the one nanoparticle 54 and the further nanoparticles 58, within the graphite layer 68 of the nanowire 60. From FIG. 9 it can be seen that the core region 67 of cobalt carbide generally has an approximately regular crystalline structure.

Figure 10:
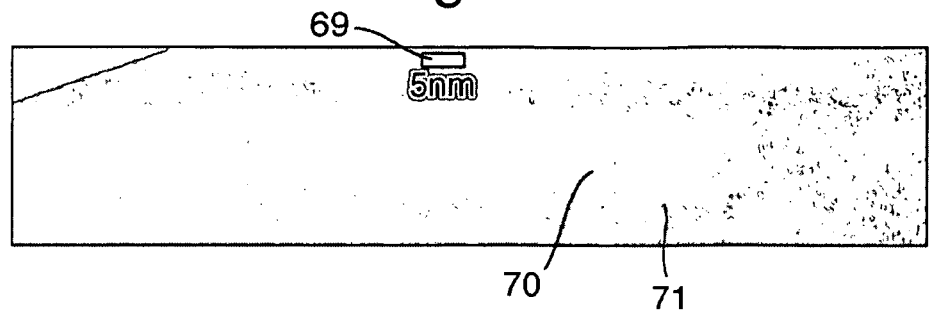
FIG. 10 shows an image of a nanowire formed in accordance with an embodiment of the present invention.

FIG. 10 shows a TEM image of a further nanowire formed in accordance with this embodiment. The nanowire is similar to those described above and illustrated in FIG. 9. The scale bar 69 indicates the average diameter of the nanowires to be approximately 11 nm. A core region 70 of this nanowire and a graphite layer 71 are similar to the core region 67 and the graphite layer 68 of the nanowire 60 described using FIG. 9 except that the core region 70 has a considerably less regular crystalline structure and the graphite layer 71 comprises structural defects.

Figure 11:
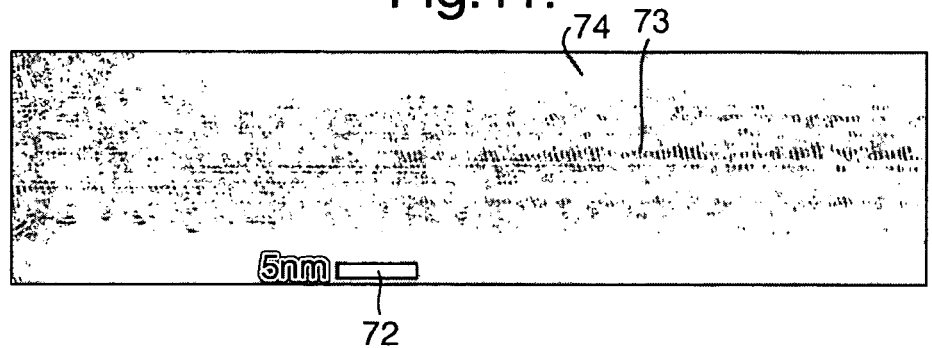
FIG. 11 shows an image of a nanowire following an annealing process in accordance with an embodiment of the present invention.

FIG. 11 shows a TEM image of a nanowire following an annealing process. The annealing process for the nanowires 60 used involves applying heat to reach a temperature of between 300 and 600° C., in this embodiment approximately 375° C. The nanowires 60 are annealed at this temperature for an appropriate amount of time. The annealing process causes at least a majority of carbon in the core region 67 of the nanowires 60 to move to the graphite layer 68. Additionally the annealing process helps to pack atoms of the core region 67 more closely by a sintering process. Nitrogen gas may be used to provide a non-reactive environment during this annealing process. The annealed nanowires comprise an annealed core region 73 which has a substantially continuous crystalline structure which is substantially consistent with a crystal structure projection of delta-cobalt (δ-Co). This crystalline structure is similar to that of the annealed core region 24 of the annealed nanoparticles. Surrounding this is an annealed graphite layer 74 which comprises a greater plurality of graphite layers than the graphite layer of the nanowire 60 prior to the annealing process. The scale bar 72 indicates the average diameter of the annealed nanowires to be approximately 8 nm.

Figure 12:
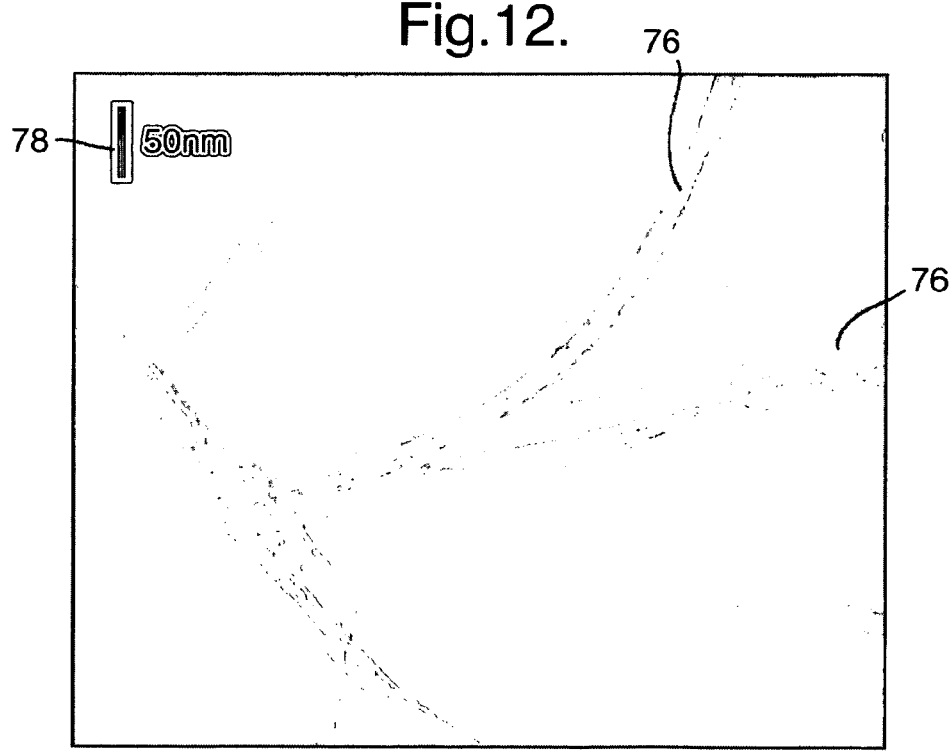
FIG. 12 shows an image of nanowires formed in accordance with a different embodiment of the present invention.

FIG. 12 shows a TEM image of nanowires formed in accordance with a different embodiment of the present invention. In this different embodiment the nanoparticles provided on the TEM grid are cobalt carbide nanoparticles formed in the carbon arc technique, having subsequently been annealed, as described earlier and illustrated in FIG. 3. Nanowires are formed using the annealed nanoparticles according to the method described above for the previous embodiment. FIG. 11 shows nanowires 76 formed according to the method of this embodiment. The scale bar 78 indicates the average diameter of the nanowires to be approximately 15 to 25 nm. Additionally, the length of the nanowires 76 is often in excess of 500 nm.

With the nanoparticles having been annealed, the assembling step of the nanoparticles according to this embodiment proceeds at a higher rate than for the non-annealed nanoparticles of previously described embodiments. This is indicated by the relatively long length of at least some of the nanowires (above 500 nm).

Figure 13:
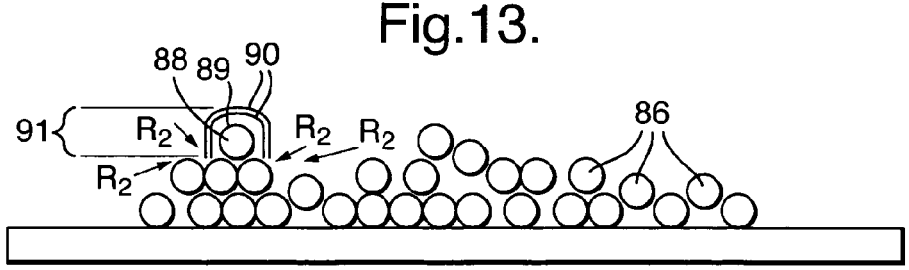
FIG. 13 shows schematically a step of forming a nanotube according to an embodiment of the present invention.

FIG. 13 shows schematically a step of forming a nanotube according to an embodiment of the present invention. In this embodiment, a similar process to that described above is provided, except that a substantially hollow nanotube is formed.

In accordance with the carbon nanowire formation method described above, an agglomeration of cobalt carbide nanoparticles 86 are provided on a TEM copper grid. The nanoparticles 86 of this embodiment are the nanoparticles formed in the carbon arc technique described earlier which have not been subsequently annealed. The density of the nanoparticles in the agglomerate in this embodiment is, however, less than a density of the nanoparticles in the agglomerate used in the above embodiments to form nanowires.

The nanoparticles are then exposed to a vapour under nanotube formation conditions. The molecules of the vapour are fluorocarbon molecules which contain carbon and are fluorocarbon decomposition products $R_2$, typically having a chemical formula $C_2ClF_3$. The initially solid polymer which provides these decomposition products $R_2$ is in this embodiment Kel-F®, as described in further detail above.

Upon providing the nanotube formation conditions, the decomposition products $R_2$ reach the nanoparticles 86 including the nanoparticle 88 shown. The decomposition products $R_2$ are believed to interact with an exterior 89 of the nanoparticles 86 as indicated by arrows in FIG. 13, and further decomposition of the decomposition products $R_2$ is caused by catalytic action of the nanoparticles 86. The further decomposition of the decomposition products $R_2$ yields carbon, fluorine and chlorine. At least some of the carbon of the decomposition products $R_2$, produced in this further decomposition, is deposited onto the exterior of the one nanoparticle 88 to form a first deposit of carbon 91 (indicated in FIG. 14 using dashed lines) which comprises a plurality of layers of graphite 90 and which surround at least part of the exterior 89.

Figure 14:
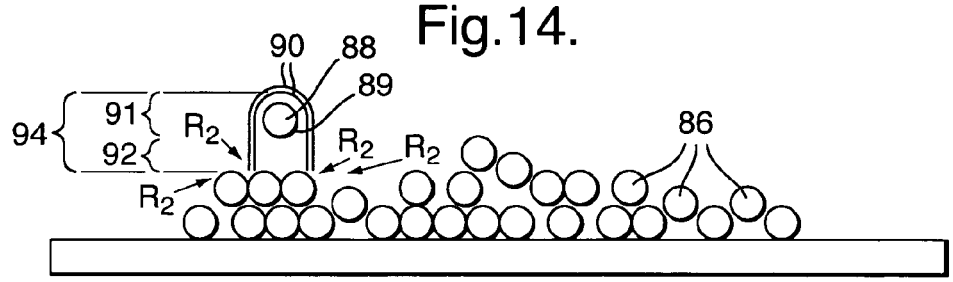
FIG. 14 shows schematically a further step of forming the nanotube according to an embodiment of the present invention.

FIG. 14 shows schematically a further step of the process of forming the nanotubes. Following deposition of the first deposit of carbon 91, further decomposition of the monomers $R_2$ is provided by the catalytic action of the nanoparticles 86 within the vicinity of the one nanoparticle 88. At least some further carbon of the decomposition products $R_2$, provided by the decomposition, is deposited so as to attach a second deposit 92 of carbon (indicated in FIG. 14 using dashed lines) onto the first deposit 91 to form a nanotube 94. The second deposit 92 comprises layers of graphite 90. In this embodiment, the nanotube comprises layers of graphite. Alternatively, or in addition, the nanotube may include defective graphite, amorphous carbon and/or carbon fiber.

Figure 15:
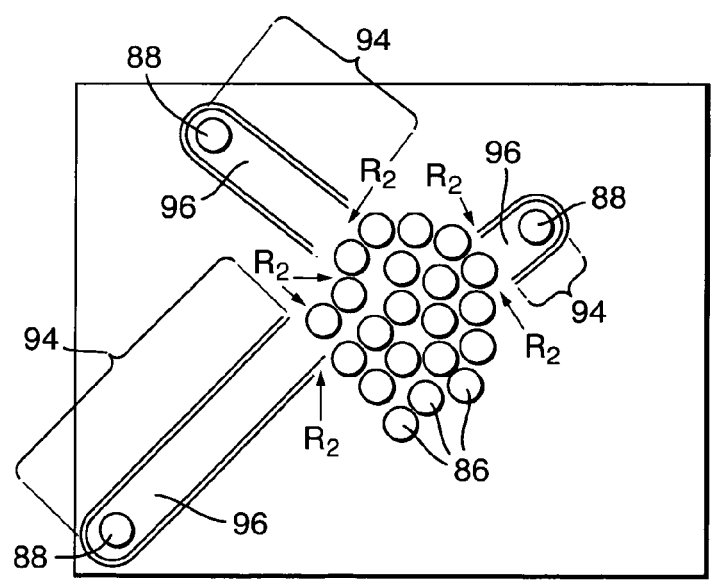
FIG. 15 shows schematically, as a top view, a formation of nanotubes according to an embodiment of the present invention.

FIG. 15 shows schematically as a top view, a formation of a plurality of the nanotubes 94 according to the method of forming nanotubes of this embodiment. Note that a plurality of nanotubes 94 is formed from a single agglomerated mass of nanoparticles 86.

Each nanotube 94 is substantially linear and generally one nanoparticle 88 is encapsulated within a tip of the nanotube 94. Aside from this one nanoparticle 88 at the tip, a nanotube core region 96 is substantially hollow. The nanotube comprises a plurality of layers of graphite 90.

Figure 16:
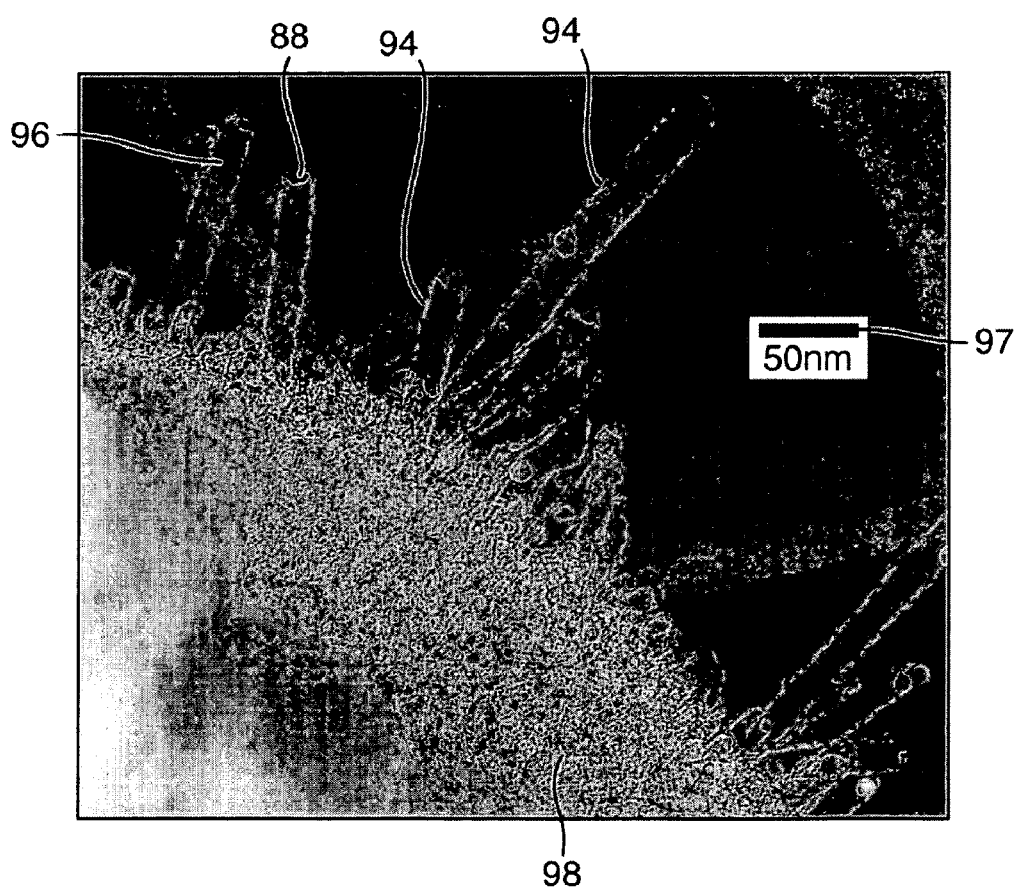
FIG. 16 shows an image as a top view of the formation of nanotubes in accordance with an embodiment of the present invention.

FIG. 16 shows an image of the formation of the plurality of nanotubes 94 from a top view. The image, taken using a transmission electron microscope (TEM), has a scale bar 97 which indicates the average diameter of nanotubes 94 to be approximately 15 to 25 nm. Within this image, the individual nanoparticles 86 are not easily apparent but the agglomerated mass 98, from which the plurality of nanotubes 94 are formed, is easily distinguished. The image of FIG. 16 is taken looking down towards the surface of the TEM grid 52 on which the nanoparticles 86 are dispersed. Nanotubes 94 are seen forming in directions approximately parallel a plane of the surface of the TEM grid 52. It is noted that the nanotubes 94 also may form in further directions, including a direction towards the viewer of FIG. 16. FIG. 16 illustrates the one nanoparticle 88 at the tip of each nanotube 94 and the nanotube core region 96 which is substantially hollow.

The embodiments described above are exemplary embodiments of the present invention. Further embodiments are envisaged.

The metallic material of the nanoparticles of the embodiments described is cobalt carbide. It is alternatively envisaged that the metallic material is substantially pure cobalt metal or a substantially pure ferromagnetic metal or a carbon alloy of a ferromagnetic metal selected from the group of metals nickel, iron, platinum and palladium. Alternatively the metallic material may be a different ferromagnetic or non-ferromagnetic metal. Further, the material forming the nanowire may be a non-metallic material, such as a semiconductor.

For the forming of the nanowires in the described embodiments, the molecules are fluorocarbon decomposition products. It is alternatively envisaged that the molecules may either be different halogenated molecules or different molecules which contain carbon.

The forming of the nanotubes as described uses molecules which are fluorocarbon decomposition products. It is envisaged that alternative halogenated molecules may be used.

The molecules of the described embodiments are decomposition products which are provided from a polymer. It is alternatively envisaged that the molecules are not decomposition products from a polymer, but may be and are provided in a different form, for example as a gas or even a liquid. It is envisaged that further methods of forming nanoparticles may be used, for example the use of an electric arc technique in a liquid.

The material deposited onto the surfaces of the nanoparticles is, in the described embodiments, some form of carbon. However, it is envisaged that other materials may be used to provide the material surrounding the nanowires or the material forming the nanotubes.

Alternative embodiments of the apparatus for the method of the present invention are envisaged. For example, the TEM grid substrate may be a different substrate and the reaction vessel and/or reagent vessels may be different in specification.

The annealing process of the cobalt carbide nanoparticles and of the nanowires is envisaged to be different to that described. The temperature, reduced pressure, time period for which the process is provided, and, for the nanowire, any gas which is used to aid the process are all envisaged to be different. The temperature may be higher, for example approximately 700° C.

It is envisaged that the method of the present invention may be adapted to form nanowires or nanotubes by self-assembly methods using for example, electron lithography techniques. By arranging the nanoparticles on a substrate according to precise locations of a desired configuration of the nanowire or nanotube to be formed, it is envisaged that a nanowire or nanotube having the desired configuration may be readily formed on the substrate. An envisaged application of this method is the forming of nanowires having desired configurations on substrates, so as to form integrated electrical nanocircuits or micro electronic mechanical systems (MEMS).

A different envisaged application of the method of the present invention is in the production of semiconducting nanowires or nanotubes. The polymer which provides the decomposition products may be doped with a doping material, for example, boron or iron, such that the layer of carbon of the nanowire or the nanotube also comprises the doping material and has semiconducting properties. Semiconducting nanowires may be used to form nanoswitches including for example, a spin field effect transistor or a spintronic switch, which allow or prevent a flow of electrons between nanowires depending on a spin orientation of the electrons.

A further envisaged application of the method of the present invention is in producing nanomagnetic components based on the nanowires having a permanent magnetisation along the longitudinal length. This may allow vertical recording media clusters to be produced.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of forming a nanowire comprising:
   (a) providing an arrangement of nanoparticles comprising a first material, wherein said first material is a ferromagnetic material;
   (b) providing a vapor of molecules;
   (c) depositing at least some second material from said vapor of molecules onto an exterior surface of one of said nanoparticles to form a deposit which surrounds at least part of the exterior of said one nanoparticle; and
   (d) assembling more of said first material from said nanoparticles with said one nanoparticle to produce an elongate configuration of said first material in the form of a nanowire.

2. A method of forming a nanowire according to claim 1, wherein the ferromagnetic material is selected from the group consisting of the metals cobalt, nickel, platinum, palladium and iron, and the alloys containing at least one of said metals.

3. A method of forming a nanowire according to claim 1, wherein the second material comprises carbon.

4. A method of forming a nanowire according to claim 1, wherein said vapor of molecules comprises decomposition products produced from a polymer.

5. A method of forming a nanowire according to claim 4, wherein the method comprises applying a temperature sufficient to decompose the polymer to form a vapour and insufficient to cause coalescence of the nanoparticles.

6. A method of forming a nanowire according to claim 5, wherein the temperature is below 600° C.

7. A method of forming a nanowire according to claim 5, wherein the temperature is above 100° C.

8. A method of forming a nanowire according to claim 6, wherein the temperature is approximately 375° C.

9. A method of forming a nanowire according to claim 1, wherein said nanoparticles catalytically assist a decomposition process, said decomposition process providing the material to form the deposit of second material around said one particle.

10. A method of forming a nanowire according to claim 1, comprising depositing at least some of the second material to form a deposit which surrounds the sides of said nanowire.

11. A method of forming a nanowire according to claim 1, wherein the deposit of second material comprises graphite, defective graphite, amorphous carbon and/or carbon fiber.

12. A method of forming a nanowire according to claim 11, wherein the deposit of second material comprises a plurality of layers of graphite and/or defective graphite.

13. A method of forming a nanowire according to claim 1, wherein the nanowire is substantially linear.

14. A method of forming a nanowire according to claim 1, wherein the nanoparticles are provided in the form of an agglomerated mass of nanoparticles.

15. A method of forming a nanowire according to claim 14, wherein a plurality of different nanowires is formed from a single agglomerated mass of nanoparticles.

16. A method of forming a nanowire comprising:
(a) providing an arrangement of nanoparticles comprising a first material;
(b) providing a vapor of molecules;
(c) depositing at least some second material from said vapor of molecules onto an exterior surface of one of said nanoparticles to form a deposit which surrounds at least part of the exterior of said one nanoparticle, wherein the second material comprises carbon; and
(d) assembling more of said first material from said nanoparticles with said one nanoparticle to produce an elongate configuration of said first material in the form, of a nanowire, wherein said vapor of molecules comprises fluorocarbon molecules.

17. A method of forming a nanowire comprising:
(a) providing an arrangement of nanoparticles comprising a first material;
(b) providing a vapor of molecules;
(c) depositing at least some second material from said vapor of molecules onto an exterior surface of one of said nanoparticles to form a deposit which surrounds at least part of the exterior of said one nanoparticle;
(d) assembling more of said first material from said nanoparticles with said one nanoparticle to produce an elongate configuration of said first material in the form of a nanowire; and
(e) depositing at least some of the second material to form a deposit, which surrounds the sides of said nanowire, wherein the nanoparticles comprise carbon and the method further comprises an annealing process which causes the carbon from the nanoparticles in the nanowire to migrate into the second material surrounding the nanowire.

18. A method of forming a nanotube comprising:
(a) providing an arrangement of nanoparticles comprising a first material;
(b) providing a fluid of halogenated molecules, wherein said fluid of halogenated molecules comprises decomposition products produced from a polymer;
(c) depositing at least some second material from said halogenated molecules onto an exterior surface of one of said nanoparticles to form a first deposit of second material which surrounds at least part of the exterior of said one nanoparticle; and
(d) depositing at least some further second material from said halogenated molecules so as to attach a second deposit of said second material onto said first deposit, to produce an arrangement of deposits in the form of a nanotube.

19. A method of forming a nanowire comprising:
(a) providing an arrangement of nanoparticles comprising a first material;
(b) providing a fluid of molecules;
(c) depositing at least some second material from said fluid of molecules onto an exterior surface of one of said nanoparticles to form a deposit which surrounds at least part of the exterior of said one nanoparticle; and
(d) assembling more of said first material from said nanoparticles with said one nanoparticle to produce an elongate configuration of said first material in the form of a nanowire, wherein said first material is a ferromagnetic material.

20. A method of forming a nanowire according to claim 19, wherein the ferromagnetic material is selected from the group consisting of the metals cobalt, nickel, platinum, palladium and iron, and the alloys containing at least one of said metals.

21. A method of forming a nanowire according to claim 19, wherein the second material comprises carbon and said fluid of molecules comprises fluorocarbon molecules.

22. A method of forming a nanowire according to claim 19, comprising depositing at least some of the second material to form a deposit which surrounds the sides of said nanowire, wherein the nanoparticles comprise carbon and the method further comprises an annealing process which causes the carbon from the nanoparticles in the nanowire to migrate into the second material surrounding the nanowire.

* * * * *